United States Patent [19]
Tano

[11] Patent Number: 6,004,707
[45] Date of Patent: Dec. 21, 1999

[54] METHOD AND APPARATUS FOR FORMING IMAGE USING AN IMPROVED LIQUID DEVELOPING TECHNIQUE

[75] Inventor: Atsushi Tano, Kawasaki, Japan

[73] Assignee: Fujitsu Limited, Kawasaki, Japan

[21] Appl. No.: 08/988,375

[22] Filed: Dec. 10, 1997

[30] Foreign Application Priority Data

Mar. 19, 1997 [JP] Japan ........................................ 9-66692

[51] Int. Cl.$^6$ ............................ G03G 9/16; G01D 15/06
[52] U.S. Cl. ................................ 430/31; 430/45; 347/112
[58] Field of Search ................................ 430/45, 47, 31; 347/112

[56] References Cited

U.S. PATENT DOCUMENTS

| | | | |
|---|---|---|---|
| 3,776,757 | 12/1973 | Eastman et al. .......................... | 430/45 |
| 3,840,385 | 10/1974 | Yoskida .................................. | 117/17.5 |
| 4,729,310 | 3/1988 | Love, III ................................ | 101/157 |
| 5,539,440 | 7/1996 | Higuchi et al. .......................... | 347/112 |

FOREIGN PATENT DOCUMENTS

| | | |
|---|---|---|
| 0 406 414 A1 | 1/1991 | European Pat. Off. . |
| 0 432 458 A2 | 6/1991 | European Pat. Off. . |
| 4-21844 | 1/1992 | Japan . |
| 6-127110 | 5/1994 | Japan . |
| 6-230616 | 8/1994 | Japan . |

OTHER PUBLICATIONS

Abstract of Japanese Publication No. 63–134241.
Abstract of Japanese Publication No. 63–151456.
Abstract of Japanese Publication No. 6–127110.
Abstract of Japanese Publication No. 49–006222 (Derwent Publication).
Abstract of Japanese Publication No. 05–008575 (Derwent Publication).

*Primary Examiner*—John Goodrow
*Attorney, Agent, or Firm*—Armstrong, Westerman, Hattori, Mcleland & Naughton

[57] ABSTRACT

An image forming method and an image forming apparatus achieve a high developing speed and high transferring efficiency. The method forms a latent image on the surface of an image carrier that repels a coloring liquid, attaches an affinity agent (containing fine silica grains) that has affinity for the coloring liquid, onto the latent image with the electrostatic force, and attaches the coloring liquid onto the affinity agent on the latent image, to visualize the latent image. The method efficiently transfers the visualized image having the affinity agent to a recording medium, to provide a fixed image.

12 Claims, 4 Drawing Sheets

METHOD AND APPARATUS FOR FORMING IMAGE USING AN IMPROVED LIQUID DEVELOPING TECHNIQUE

BACKGROUND OF THE INVENTION

1. Field of the Invention

The present invention relates to a method and an apparatus for forming an image, applicable to printers and copiers.

2. Description of the Related Art

A typical image forming method employed by printers and copiers is a toner developing method (an electrostatic latent image method). This method attaches toner to an electrostatic latent image by electrostatic attractive force to develop the latent image. This method is mainly achieved as a powder developing technique (a dry toner developing technique) and as a liquid developing technique (a liquid toner developing technique).

The powder developing technique attaches charged coloring powder toner made of fine resin grains of 6 to 15 µm in diameter to an electrostatic latent image with electrostatic attractive force.

The liquid developing technique disperses coloring powder toner made of resin in an insulating liquid serving as a dispersion liquid, electrically charges the toner in the liquid, and attaches the solution to an electrostatic latent image with an electrostatic attractive force. This technique employs very fine toner having a grain diameter of 0.1 to several microns to realize higher definition recording than the powder developing technique and provide excellent color reproducibility.

The liquid developing technique electrophoreses charged toner dispersed in a liquid with electrostatic attractive force so that the toner may attach to an electrostatic latent image. At this time, the toner moving toward the latent image receives the viscous resistance of the liquid, to slow down. Consequently, the toner takes a long time to attach itself to the latent image when providing the latent image with a proper density. Namely, the liquid developing technique involves a slow developing speed and a slow printing speed. Since the toner is made of very fine grains, it physically strongly adheres to an image carrier on which an electrostatic latent image is formed. As a result, after the image is transferred to a recording medium, the toner tends to remain on the image carrier, thereby deteriorating transferring efficiency. In view of this, new developing techniques that employ no electrostatic latent image have been developed based on the liquid developing technique. These new techniques change the affinity of an image carrier for ink or coloring liquid before attaching the ink to the image carrier. These techniques are simple forms of offset printing that attach oil-based ink to an image carrier by using a difference in the hydrophilic or lipophilic property of the image carrier. These techniques may collectively be called as an "ink developing technique" or an "affinity/repellency latent image technique." They are disclosed in, for example, Japanese Unexamined Patent Publication Nos. 4-21844, 6-230616, and 6-127110.

The publication No. 4-21844 forms an image carrier from photochromic polymers so that the surface of the image carrier may reversibly change the chemical structure thereof in response to external signals applied to form a latent image on the surface. Namely, the area where the latent image is formed on the image carrier shows hydrophilicity and the other area thereof shows hydrophobicity. The latent image area is developed with water-soluble ink, and the ink on the image is transferred to a recording medium.

The publication No. 6-230616 employs a printing plate made of a conductive support layer (a first layer) having electric potential, an optical semiconductor layer (a second layer), and an electrical insulating layer (a third layer) having water repellency. When exposed to a laser beam, the second layer becomes conductive to inject charges from the first layer into the third layer. The charge-injected part changes from nonpolar to polar, i.e., from lipophilic to hydrophilic, to form a latent image that shows affinity for ink.

The publication No. 6-127110 disperses fine resin grains in a dispersion medium and heats and/or pressurizes the solution to attach the solution to a latent image formed on an image carrier that has liquid repellency. The part where the resin grains are adhering to the image carrier shows affinity for ink to visualize the latent image.

These techniques may have a sufficient developing speed. However, they have poor ink transferring efficiency because ink sticks to a latent image formed on the image carrier due to the improved affinity of ink to the-latent-image-formed part of the image carrier. Accordingly, these techniques are appropriate only when printing many copies of a single image.

SUMMARY OF THE INVENTION

An object of the present invention is to provide a method of and an apparatus for forming an image, capable of completely solving the problems of the prior arts.

In order to accomplish the object, the present invention provides a method of forming an image, including the steps of forming a latent image on the surface of an image carrier that repels a coloring liquid, attaching an affinity agent, which has affinity for the coloring liquid, onto the latent image with electrostatic force, and attaching the coloring liquid onto the affinity agent on the latent image, to visualize the latent image. The method may further include the step of transferring the visualized image having the affinity agent to a recording medium, to provide a fixed image. The present invention also provides an apparatus for forming an image, having an image carrier that repels a coloring liquid, a unit for forming a latent image on the surface of the image carrier, a unit for attaching an affinity agent, which has affinity for the coloring liquid, onto the latent image with electrostatic force, and a unit for attaching the coloring liquid onto the affinity agent on the latent image, to visualize the latent image. The apparatus may further have a unit for transferring the visualized image having the affinity agent to a recording medium, to provide a fixed image.

The coloring liquid used for the method and apparatus of the present invention may be a liquid containing a predetermined coloring agent dispersed therein, or a liquid colored with a predetermined dye. The affinity agent may include fine grains dispersed in a predetermined dispersion liquid. The fine grains may be electrically charged, and preferably, may be fine silica ($SiO_2$) grains. The charged fine grains, which may he transparent, are attached to the electrostatic latent image with electrostatic attractive force. At this time, the quantity of the attached fine grains is small but sufficient to show affinity for ink. Unlike the conventional liquid developing technique, there is no need to attach toner until the latent image is provided with a sufficient density. Accordingly, the present invention improves a developing speed and printing speed.

When transferring the visualized image having the affinity agent from the image carrier to the recording medium to provide a fixed image, the affinity agent may serve as a detaching layer to greatly improve transferring efficiency. Due to this, the present invention needs no cleaning mechanism. Further, the present invention will need no static eliminator, if it employs a conductive coloring liquid.

If the coloring liquid is made of a liquid containing a predetermined coloring agent dispersed therein, or a liquid colored with a dye, the present invention will provide a color (full-color) image having an improved color reproducibility. On the other hand, the conventional powder developing technique provides a poor color reproducibility because powder toner scatters light.

If the affinity agent includes fine grains dispersed in a predetermined dispersion liquid, the present invention will provide a high-resolution image.

If the fine grains are electrically charged, they will easily separate from the image carrier due to electrostatic force.

If the fine grains are silica ($SiO_2$) grains, they will not interfere with color reproducibility because they have no color.

BRIEF DESCRIPTION OF THE DRAWINGS

These and other objects of the present invention will become apparent from the following detailed description of the preferred embodiments of the invention, taken in connection with the accompanying drawings.

In the drawings.

DESCRIPTION OF THE PREFERRED EMBODIMENTS

Embodiments of the present invention will be explained with reference to the drawings.

FIGS. 1A–1E show image forming processes according to the principle of the present invention.

Figure 1A:
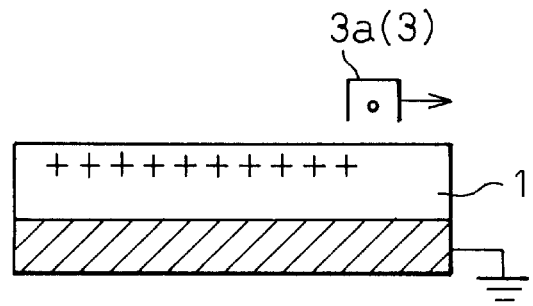
FIG. 1A is a view illustrating an electric charging step onto an image carrier according to the present invention.

In FIG. 1A, an image carrier 1 repels coloring liquids serving as developing agents. The surface of the image carrier 1 is charged with a charging unit 3a (of an electrostatic latent image forming unit 3).

Figure 1B:
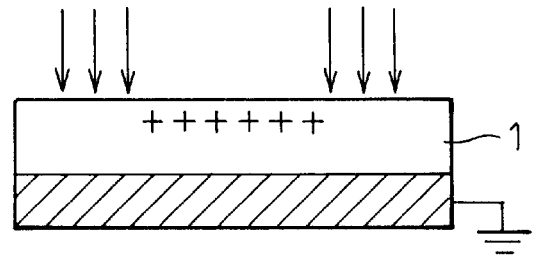
FIG. 1B is a view illustrating an exposing and latent image forming step onto the image carrier.

In FIG. 1B, the image carrier 1 is exposed to light to form an electrostatic latent image on the image carrier 1.

Figure 1C:
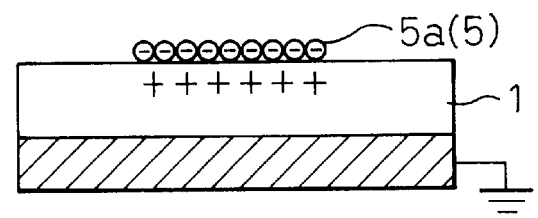
FIG. 1C is a view illustrating an affinity agent attaching step onto the image carrier.

In FIG. 1C, an affinity agent 5 is attached to the latent image with electrostatic force. The affinity agent 5 has affinity for coloring liquids.

Figure 1D:
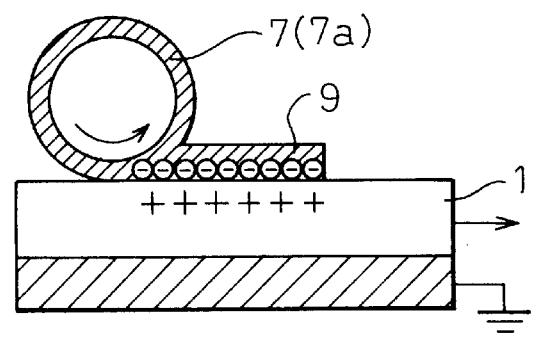
FIG. 1D is a view illustrating a coloring liquid attaching and image visualizing step onto the image carrier.

In FIG. 1D, an applicator 7 serving as a visualizing unit evenly applies a coloring liquid 9 to the surface of the image carrier 1. A part where no latent image is formed of the surface of the image carrier 1 repels the coloring liquid 9. Consequently, the coloring liquid 9 attaches only to the latent image having the affinity agent 5, thereby visualizing the latent image.

Figure 1E:
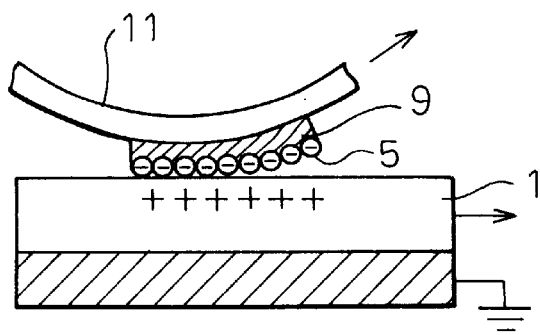
FIG. 1E is a view illustrating an image transferring step from the image carrier.

In FIG. 1E, the visualized image is transferred from the image carrier 1 to a recording medium 11, to provide a fixed image.

In this way, the present invention employs, instead of powder toner, the coloring liquid 9 such as printing ink having an improved coloring property, to speedily visualize a latent image and provide a high-resolution fixed image.

The conventional liquid developing technique mentioned above usually needs a long developing time to provide an image with a sufficient density, for example, a reflection density of 1.3 or over. On the other hand, the present invention realizes a very short developing time because it attaches a required quantity of the affinity agent 5 to the image carrier 1 and applies the coloring liquid 9 to the affinity agent 5 when visualizing a latent image.

According to the present invention, the coloring liquid 9 may be conductive to leak charges from a latent image to which the coloring liquid is applied. This makes a static eliminator (not shown) unnecessary.

When the latent image visualized with the coloring liquid 9 on the image carrier 1 is transferred to the recording medium 11 with or without the use of an intermediate transfer unit (not shown), the affinity agent 5 functions as a detaching layer to greatly improve the transferring efficiency.

With the improved transferring efficiency and the repellency (to be explained later in detail) of the surface of the image carrier 1, the present invention needs no cleaning mechanism such as a blade for cleaning the surface of the image carrier 1.

The affinity agent 5 contains, for example, fine transparent grains 5a, to form a detaching layer that easily separates from the image carrier 1, and with the coloring liquid 9, transfers to the recording medium 11. Accordingly, the image carrier 1, affinity agent 5 (5a), coloring liquid 9, and recording medium 11 must have the following adhesive relationships:

adhesion between image carrier and affinity agent<adhesion between affinity agent and coloring liquid<adhesion between coloring liquid and recording medium.

The coloring liquid 9 must properly adhere to the affinity agent 5 on the surface of the image carrier 1. Accordingly, the coloring agent 9 must satisfy the following expression:

adhesion between image carrier and affinity agent>tack value of coloring liquid.

Figure 2:
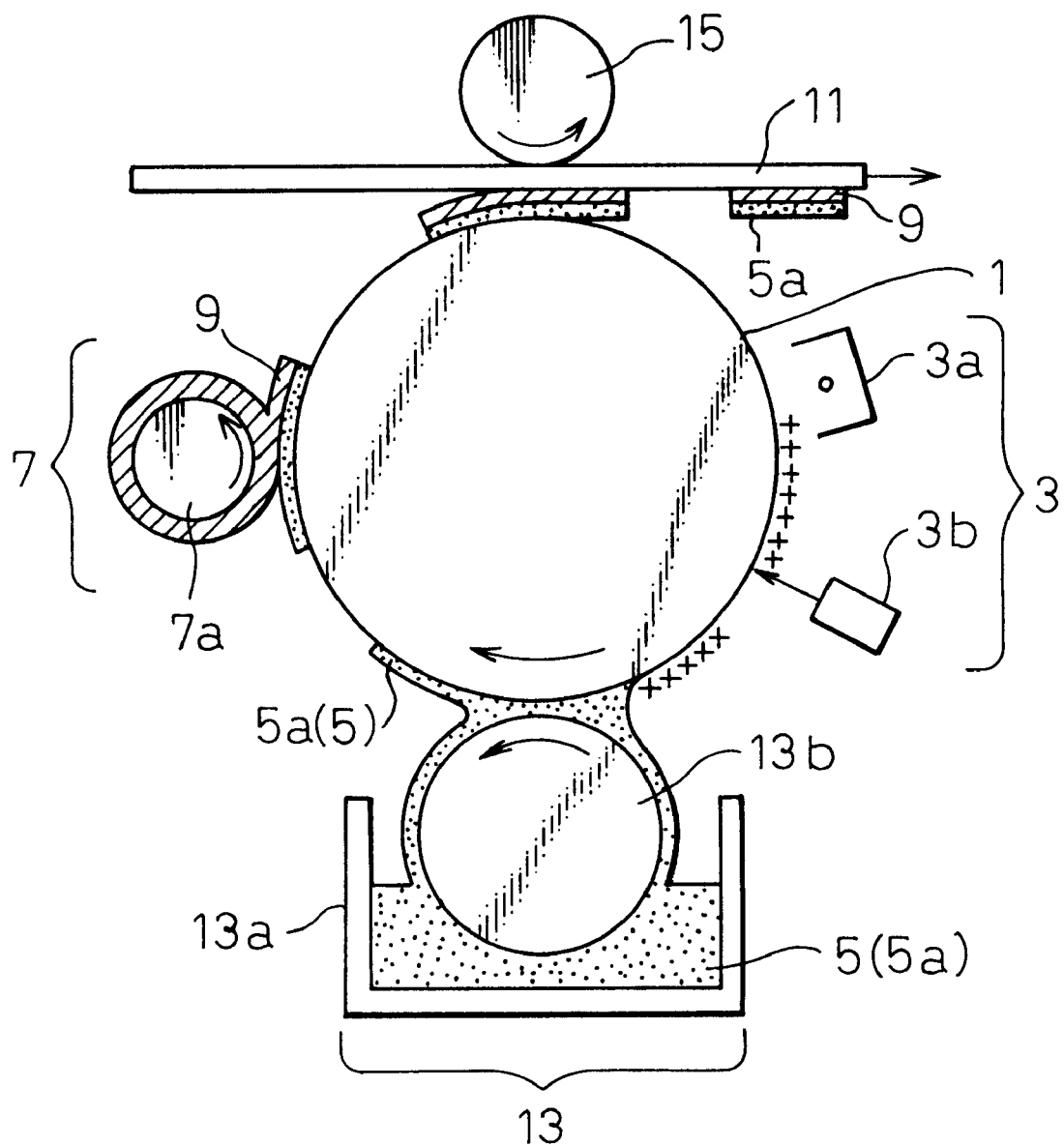
FIG. 2 shows an image forming apparatus according to the present invention, for achieving the processes of FIGS. 1A–1E.

FIG. 2 shows an image forming apparatus according to an embodiment of the present invention, for achieving the image forming processes of FIGS. 1A–1E. The same parts as those of FIGS. 1A–1E are represented with like reference numerals, and their explanations are not repeated. In FIGS. 1A–1E and FIG. 2, an electrostatic image is formed according to an electronic photographing method. Instead, other electrostatic image forming methods such as an electrostatic recording method and an ion flow method are adoptable.

In FIG. 2, an image carrier 1 has a surface that repels a coloring liquid 9. The surface is uniformly charged with a charging unit 3a (of an electrostatic image forming unit 3) to +100 V to +1000 V. The charging unit 3a may be a corona electrifier. The surface of the image carrier 1 is treated to repel the coloring liquid 9. This treatment is made by coating the surface with fluororesin and silicon resin, or by forming the image carrier 1 itself with repellent material, or by a combination of them.

An exposing unit 3b (of the image forming unit 3) emits tight to form an electrostatic latent image on the image carrier 1.

An attaching unit 13 attaches an affinity agent 5 to the latent image on the image carrier 1 with electrostatic force. The affinity agent 5 contains electrically charged fine transparent grains 5a that have affinity for the coloring liquid 9. The attaching unit 13 is composed of a tank 13a for storing the affinity agent 5 and a supply roller 13b that is spaced away from the image carrier 1 by a predetermined gap, to apply a predetermined developing bias voltage.

A roller 7a of an applicator or a visualizing unit 7 evenly applies the coloring liquid 9 to the image carrier 1. A part where no latent image is formed of the image carrier 1 repels the coloring liquid 9. Accordingly, the coloring liquid 9 adheres only to the latent image to which the affinity agent 5 is adhering, thereby visualizing the latent image.

A transfer roller 15 presses a recording medium 11 against the image carrier 1, to transfer the visualized image from the image carrier 1 to the recording medium 11, thereby providing a high-resolution fixed image (9, 5a).

The coloring liquid 9 must have affinity for the affinity agent 5 that is adhering to the latent image formed on the image carrier 1. At the same time, the coloring liquid 9 must not adhere to the image carrier 1 where no latent image is present. Examples of the coloring liquid 9 are as follows:

(i) Carbon-water dispersion liquid containing fine carbon grains and dispersion improving agents dispersed in water.

(ii) Dye ink such as ink-jet ink dissolving dyes and additives in water.

(iii) Printing ink such as offset printing ink having a viscosity of 100 to 300 poises, gravure ink having a viscosity of 0.8 to 4.0 poises, and relief printing ink having a viscosity of 20 to 300 poises.

For the present invention, the gravure ink is preferable due to the low viscosity thereof. The gravure ink is classified into lipophilic ink employing organic solvents and hydrophilic ink. The affinity of ink for an affinity agent must properly be adjusted before use.

The affinity agent may contain fine grains each of 3 $\mu$m or less and, preferably, less than a micron in diameter. The smaller the diameter of each grain, the higher the resolution of an image to be formed. For example, the affinity agent is composed of (i) fine inorganic grains such as transparent silica ($SiO_2$) grains and aluminum oxide grains each of 0.1 $\mu$m or below in diameter, (ii) fine polymer grains made of, for example, polymethyl methacrylate, acrylic, stylene, urethane, polyurethane, and their copolymers, or (iii) colloidal solution of gum arabic, polyacrylic acid, stearic acid, tannin acid, and metal alum.

Tests were made to actually form images according to the present invention and the prior art. The results thereof will be explained with reference to FIGS. 3 to 6.

An image carrier used for the tests had a photosensitive body coated with fluororesin (PTFE) to repel ink and coloring liquids. The surface of the image carrier was uniformly charged with a corona electrifier to +100 V to +1000 V. The image carrier was exposed to light to form an electrostatic latent image thereon.

An affinity agent was prepared from fine transparent silica grains such as Aerosil-200 of Nippon Aerosil of 1 $\mu$m or below in diameter by dispersing them in isoparaffin-based hydrocarbon (Isopar G of Exxon Chemical) serving as an insulating dispersion medium. To negatively charge the silica grains in the dispersion medium, an electrification agent (also serving as a dispersion agent) such as an anion-based surfactant (Viewlight ECA of Sanyo Kasei) was added to the dispersion medium. Any other dispersion medium is usable if it has a sufficient insulating property to prevent a leak of charges that form a latent image when the affinity agent is applied to the latent image. For example, normal paraffin hydrocarbon, silicon oil, perfluoro-solvent, naphtha, and mineral spirit are usable as a dispersion medium. Other examples of electrification agents are ionic surfactants, metal soaps, and charge controlling agents.

Figure 3:
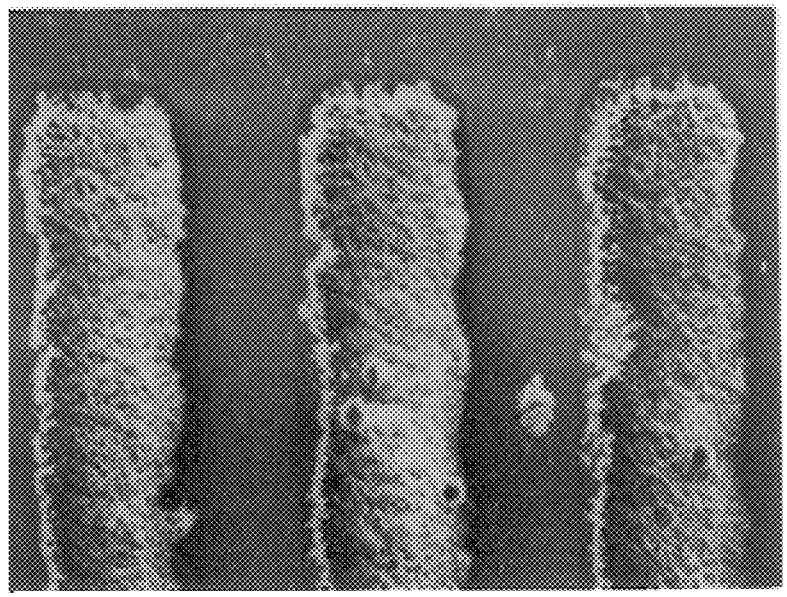
FIG. 3 is a photomicrograph showing fine silica grains adhering to the surface of an image carrier in a test of the present invention.

An aluminum roller was used to attach the silica grains to the latent image on the image carrier with electrostatic force. A carbon-water dispersion liquid serving as a coloring liquid was applied with a roller to the image carrier. The carbon-water dispersion liquid attached only to the latent image to which the silica grains were adhering, to visualize the latent image. Thereafter, the image was transferred to a recording medium, to provide a fixed image. FIG. 3 shows a photomicrograph showing the silica grains adhering to the surface of the image carrier. It can be understood from the picture that the present invention excellently forms thin lines each of 10-odd microns wide on the image carrier.

Figure 4:
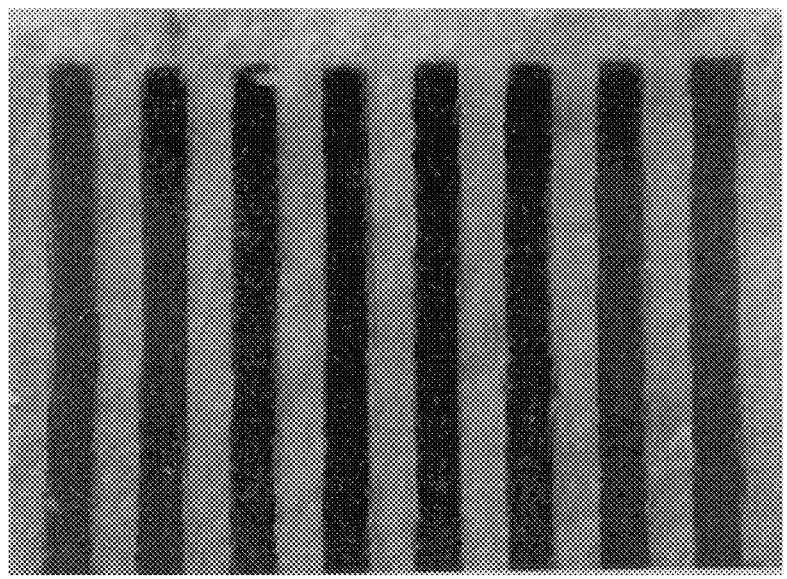
FIG. 4 is a photomicrograph showing an image of thin lines each of 100 µm in width prepared in a test of the present invention.
Figure 5:
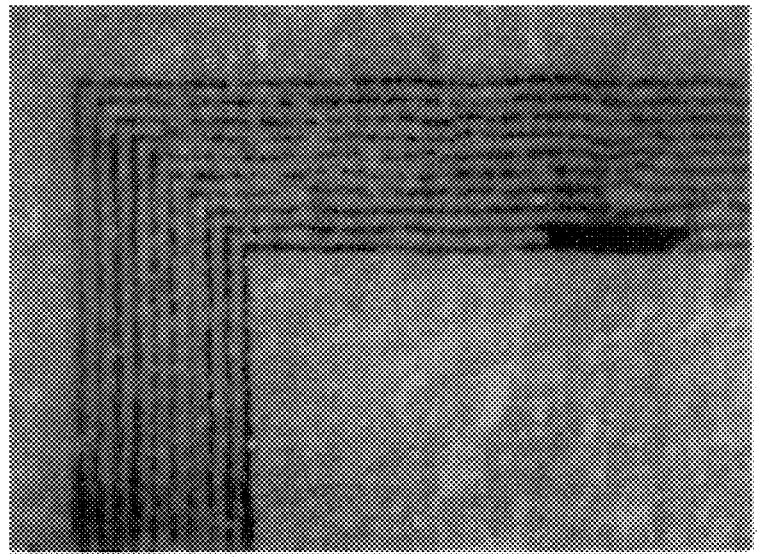
FIG. 5 is a photomicrograph showing an image of thin lines each of 15 µm in width prepared in a test of the present invention.
Figure 6:
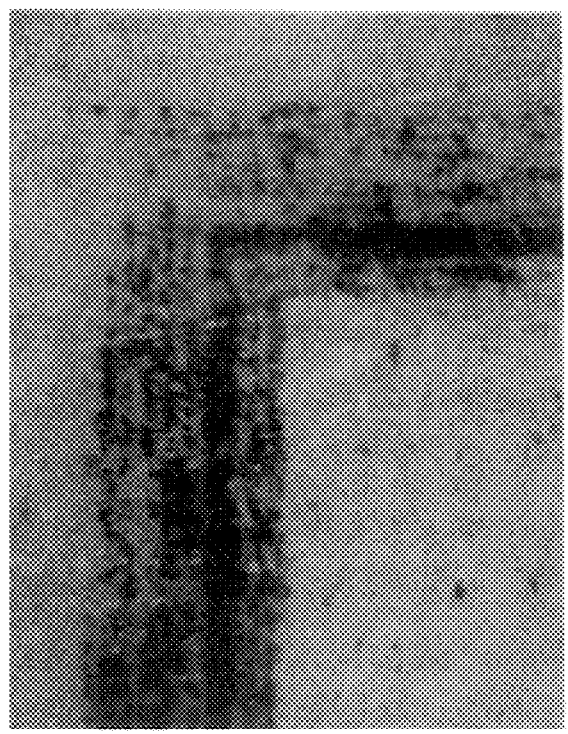
FIG. 6 is a photomicrograph showing an image of thin lines each of 15 µm in width prepared in a test of a prior art.

FIG. 4 is a photomicrograph showing a fixed image of thin lines each of 100 $\mu$m wide made from a carbon-water dispersion liquid, and FIG. 5 is a photomicrograph showing an image of thin lines each of 15 $\mu$m wide formed in the same manner. Both of FIGS. 4 and 5 are of the present invention. FIG. 6 is a comparison photomicrograph showing an image of lines each of 15 $\mu$m wide formed according to the prior art employing dry powder toner containing grains each of 6 $\mu$m in diameter. From these drawings, it is understood that the present invention is quite appropriate to form fine images.

Although the silica grains remained on the recording medium (paper) together with the coloring liquid (ink), it was confirmed through the tests that the formed images containing the silica grains had a reflection density of 1.3 or over. This value was substantially equal to a value provided by the prior art that employed no silica grains. It is usual to add the silica grains to powder toner, and therefore, they do not reversely affect the quality of images formed.

A test was carried out to compare the present invention with the prior art on the efficiency of transferring an image from an image carrier to a recording medium (paper). In the test, the present invention attached fine silica grains to a latent image formed on the fluororesin-coated surface of an image carrier, and then, a coloring liquid (carbon-water dispersion liquid) to the silica grains on the latent image. On the other hand, the prior art directly attached the coloring liquid to a latent image without fine silica grains. In the test, the prior art showed a transferring efficiency of 50% to 60%, while the present invention showed a transferring efficiency of 90% to 100%. It is apparent that the present invention with the silica grains remarkably improves the transferring efficiency. This is because a layer formed by the silica grains effectively functions as a detaching layer to completely separate the silica grains and coloring liquid (ink) from the image carrier.

As explained above, the present invention provides an image forming method and an image forming apparatus that provide high developing and printing speeds, excellent toner transferring efficiency, and smooth toner detachability.

It is to be understood that the present invention is by no means limited to the specific embodiments as illustrated and described herein, and that various modifications thereof may be made which come within the scope of the present invention as defined in the appended claims.

What is claimed is:

1. A method of forming an image, comprising the steps of:
   forming a latent image on the surface of an image carrier that repels a coloring liquid;
   attaching an affinity agent, which has affinity for the coloring liquid, onto the latent image with electrostatic force; and
   attaching the coloring liquid onto the affinity agent on the latent image, to visualize the latent image.

2. The method of claim 1, further comprising the step of transferring the visualized image having the affinity agent to a recording medium, to provide a fixed image.

3. The method of claim 1, wherein the coloring liquid is a liquid containing a predetermined coloring agent dispersed therein, or a liquid colored with a predetermined dye.

4. The method of claim 1, wherein the affinity agent includes fine grains dispersed in a predetermined dispersion liquid.

5. The method of claim 4, wherein the fine grains are electrically charged.

6. The method of claim 4, wherein the fine grains are fine silica ($SiO_2$) grains.

7. An apparatus for forming an image, comprising:
   image carrier means that repels a coloring liquid;
   means for forming a latent image on the surface of the image carrier means;
   means for attaching an affinity agent, which has affinity for the coloring liquid, onto the latent image with electrostatic force; and
   means for attaching the coloring liquid onto the affinity agent on the latent image, to visualize the latent image.

8. The apparatus of claim 7, further comprising means for transferring the visualized image having the affinity agent to a recording medium, to provide a fixed image.

9. The apparatus of claim 7, wherein the coloring liquid is a liquid containing a predetermined coloring agent dispersed therein, or a liquid colored with a predetermined dye.

10. The apparatus of claim 7, wherein the affinity agent includes fine grains dispersed in a predetermined dispersion liquid.

11. The apparatus of claim 10, wherein the fine grains are electrically charged.

12. The apparatus of claim 10, wherein the fine grains are fine silica ($SiO_2$) grains.

* * * * *